US012219368B2

(12) United States Patent
Zhang et al.

(10) Patent No.: US 12,219,368 B2
(45) Date of Patent: Feb. 4, 2025

(54) METHOD FOR BEAM REPORTING FOR MULTI-TRP TRANSMISSION SCHEMES

(71) Applicant: Apple Inc., Cupertino, CA (US)

(72) Inventors: Yushu Zhang, Beijing (CN); Haitong Sun, Irvine, CA (US); Wei Zeng, San Diego, CA (US); Dawei Zhang, Saratoga, CA (US); Weidong Yang, San Diego, CA (US); Yakun Sun, San Jose, CA (US); Qiming Li, Beijing (CN); Jie Cui, San Jose, CA (US); Hong He, Cupertino, CA (US); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 623 days.

(21) Appl. No.: 17/438,873

(22) PCT Filed: Jan. 14, 2021

(86) PCT No.: PCT/CN2021/071828
§ 371 (c)(1),
(2) Date: Sep. 13, 2021

(87) PCT Pub. No.: WO2022/151188
PCT Pub. Date: Jul. 21, 2022

(65) Prior Publication Data
US 2022/0369123 A1 Nov. 17, 2022

(51) Int. Cl.
*H04W 16/28* (2009.01)
*H04B 17/336* (2015.01)
*H04W 24/10* (2009.01)

(52) U.S. Cl.
CPC .......... *H04W 16/28* (2013.01); *H04B 17/336* (2015.01); *H04W 24/10* (2013.01)

(58) Field of Classification Search
CPC ..... H04W 16/28; H04W 24/10; H04B 17/336
See application file for complete search history.

(56) References Cited

U.S. PATENT DOCUMENTS

| 2018/0270828 | A1* | 9/2018 | Akutagawa | ....... H04W 72/0453 |
| 2018/0368142 | A1* | 12/2018 | Liou | ................. H04W 74/0808 |

(Continued)

FOREIGN PATENT DOCUMENTS

| CN | 111314952 A | 6/2020 |
| CN | 111818546 A | 10/2020 |

(Continued)

OTHER PUBLICATIONS

International Search Report for PCT Patent Application No. PCT/CN2021/071828; mailed Oct. 15, 2021.

*Primary Examiner* — Ajay Cattungal
(74) *Attorney, Agent, or Firm* — Kowert, Hood, Munyon, Rankin & Goetzel, P.C.

(57) ABSTRACT

Apparatuses, systems, and methods for beam reporting to facilitate multiple transmission and reception points, multi-TRPs, transmission schemes. A UE may receive, from a base station a configuration to report a beam quality based on at least one of a first reporting scheme and a second reporting scheme or a configuration of measurement resources for each TRP of a plurality of TRPs. The UE may report the beam quality based on the configuration or L1 measurements for multiple beam pairs and a recommended and/or assumed transmission scheme based on the configured measurement resources. The first reporting scheme may include the UE reporting at least one L1 measurement for multiple beams and the second reporting scheme may include the UE reporting at least one L1 measurement for multiple beam pairs. The recommended and/or assumed transmission scheme may be a non-coherent-joint transmission (NC-JT)

(Continued)

transmission scheme and/or a single frequency network (SFN) transmission scheme.

20 Claims, 15 Drawing Sheets

(56) References Cited

U.S. PATENT DOCUMENTS

| | | | |
|---|---|---|---|
| 2019/0021017 A1* | 1/2019 | Nagaraja | H04W 72/51 |
| 2019/0150010 A1* | 5/2019 | Kwon | H04W 24/10 |
| | | | 370/252 |
| 2020/0169374 A1* | 5/2020 | Qi | H04B 7/024 |

FOREIGN PATENT DOCUMENTS

| | | |
|---|---|---|
| WO | 2018085601 A1 | 5/2018 |
| WO | 2018141204 A1 | 8/2018 |
| WO | 2020034312 A1 | 2/2020 |

* cited by examiner

| CRI/SSBRI #1 for beam pair #1 | CRI/SSBRI #2 for beam pair #1 | CRI/SSBRI #3 for beam pair #1 | CRI/SSBRI #4 for beam pair #1 | L1-RSRP/L1-SINR for CRI/SSBRI #1 | (Differential) L1-RSRP/L1-SINR for CRI/SSBRI #2 | (Differential) L1-RSRP/L1-SINR for CRI/SSBRI #3 | (Differential) L1-RSRP/L1-SINR for CRI/SSBRI #4 |
|---|---|---|---|---|---|---|---|

FIG. 8A

| CRI/SSBRI #1 for beam pair #1 | CRI/SSBRI #2 for beam pair #1 | CRI/SSBRI #3 for beam pair #2 | CRI/SSBRI #4 for beam pair #2 | L1-RSRP/L1-SINR for beam pair #1 | (Differential) L1-RSRP/L1-SINR for beam pair #2 |
|---|---|---|---|---|---|

*FIG. 8B*

| CRI/SSBRI #1 for beam pair #1 | CRI/SSBRI #2 for beam pair #1 | CRI/SSBRI #3 for beam pair #2 | CRI/SSBRI #4 for beam pair #2 | L1-RSRP for beam pair #1 | L1-RSRP for beam pair #2 | L1-SINR for CRI/SSBRI #1 | (Differential) L1-SINR for CRI/SSBRI #2 | (Differential) L1-SINR for CRI/SSBRI #3 | (Differential) L1-SINR for CRI/SSBRI #4 |
|---|---|---|---|---|---|---|---|---|---|

*FIG. 8C*

| CRI/SSBRI #1 for beam pair #1 | CRI/SSBRI #2 for beam pair #1 | CRI/SSBRI #3 for beam pair #2 | CRI/SSBRI #4 for beam pair #2 | L1-SINR for beam pair #1 | L1-SINR for beam pair #2 | L1-RSRP for CRI/SSBRI #1 | (Differential) L1-RSRP for CRI/SSBRI #2 | (Differential) L1-RSRP for CRI/SSBRI #3 | (Differential) L1-RSRP for CRI/SSBRI #4 |
|---|---|---|---|---|---|---|---|---|---|

FIG. 8D

```
┌─────────────────────────────────────────────┐
│ Receive a configuration to report a beam    │
│ quality based on at least one of a first    │
│ reporting scheme and a second reporting     │
│ scheme                                      │
│ 902                                         │
└─────────────────────────────────────────────┘
```

```
┌─────────────────────────────────────────────┐
│ Report the beam quality based on the        │
│ configuration                               │
│ 904                                         │
└─────────────────────────────────────────────┘
```

FIG. 9

```
┌─────────────────────────────────────────────┐
│ Provide a configuration to report a beam    │
│ quality based on at least one of a first    │
│ reporting scheme and a second reporting     │
│ scheme                                      │
│ 1002                                        │
└─────────────────────────────────────────────┘
```

```
┌─────────────────────────────────────────────┐
│ Receive a report on the beam quality based  │
│ on the configuration                        │
│ 1004                                        │
└─────────────────────────────────────────────┘
```

FIG. 10

METHOD FOR BEAM REPORTING FOR MULTI-TRP TRANSMISSION SCHEMES

FIELD

The present application relates to wireless communications, and more particularly to systems, apparatuses, and methods for performing beam reporting for multiple transmission and reception points (multi-TRPs) transmission schemes, e.g., in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the robustness and accuracy of transmitted and received signals through user equipment (UE) devices, e.g., through wireless devices such as cellular phones, base stations and relay stations used in wireless cellular communications.

For example, multiple transmission and reception points (multi-TRPs) are evolving to improve reliability, coverage, and capacity performance through flexible deployment scenarios. For example, in order to support growth in mobile data traffic in 5G and enhance coverage, wireless devices are expected to access networks composed of multi-TRPs (e.g., macro-cells, small cells, pico-cells, femto-cells, remote radio heads, relay nodes, and so forth. However, various aspects of such a scheme remain under developed. Accordingly, improvements in the field are desired.

Embodiments relate to wireless communications, and more particularly to apparatuses, systems, and methods for performing beam reporting for multiple transmission and reception points (multi-TRPs) transmission schemes, e.g., in a cellular communication system.

For example, in some embodiments, a user equipment device (UE), such as UE 106, may be configured to receive, from a base station, such as base station 102, a configuration to report a beam quality based on at least one of a first reporting scheme and a second reporting scheme and report the beam quality based on the configuration. The first reporting scheme may include the UE reporting at least one L1 measurement for multiple beams and the second reporting scheme may include the UE reporting at least one L1 measurement for multiple beam pairs.

As another example, in some embodiments, a UE, such as UE 106, may be configured to receive, from a base station, such as base station 102, a configuration of measurement resources for each transmission and reception point (TRP) of a plurality of TRPs and report, to the base station, L1 measurements for multiple beam pairs and a recommended and/or assumed transmission scheme. The configuration may facilitate beam reporting for multi-TRP transmission schemes and the L1 measurements may use the measurement resources. The recommended and/or assumed transmission scheme may be a non-coherent-joint transmission (NC-JT) transmission scheme and/or a single frequency network (SFN) transmission scheme.

As a further example, a base station, such as base station 102, may be configured to send, to a UE, such as UE 106, a configuration to report a beam quality based on at least one of a first reporting scheme and a second reporting scheme and receive, from the UE, a report on the beam quality based on the configuration. The first reporting scheme may include the UE reporting at least one L1 measurement for multiple beams and the second reporting scheme may include the UE reporting at least one L1 measurement for multiple beam pairs.

As an additional example, in some embodiments, a base station, such as base station 102, may be configured to send, to a UE, such as UE 106, a configuration of measurement resources for each transmission and reception point (TRP) of a plurality of TRPs and receive, from the UE, a report of L1 measurements for multiple beam pairs and a recommended and/or assumed transmission scheme. The configuration may facilitate beam reporting for multi-TRP transmission schemes and the L1 measurements may use the measurement resources. The recommended and/or assumed transmission scheme may be a non-coherent-joint transmission (NC-JT) transmission scheme and/or a single frequency network (SFN) transmission scheme.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIGS. 8A, 8B, 8C, and 8D various formats for UE reports, according to some embodiments.

FIGS. 9-12 illustrate block diagrams of example of methods for beam reporting to facilitate multiple transmission and reception points, multi-TRPs, transmission schemes, according to some embodiments.

Figure 1:
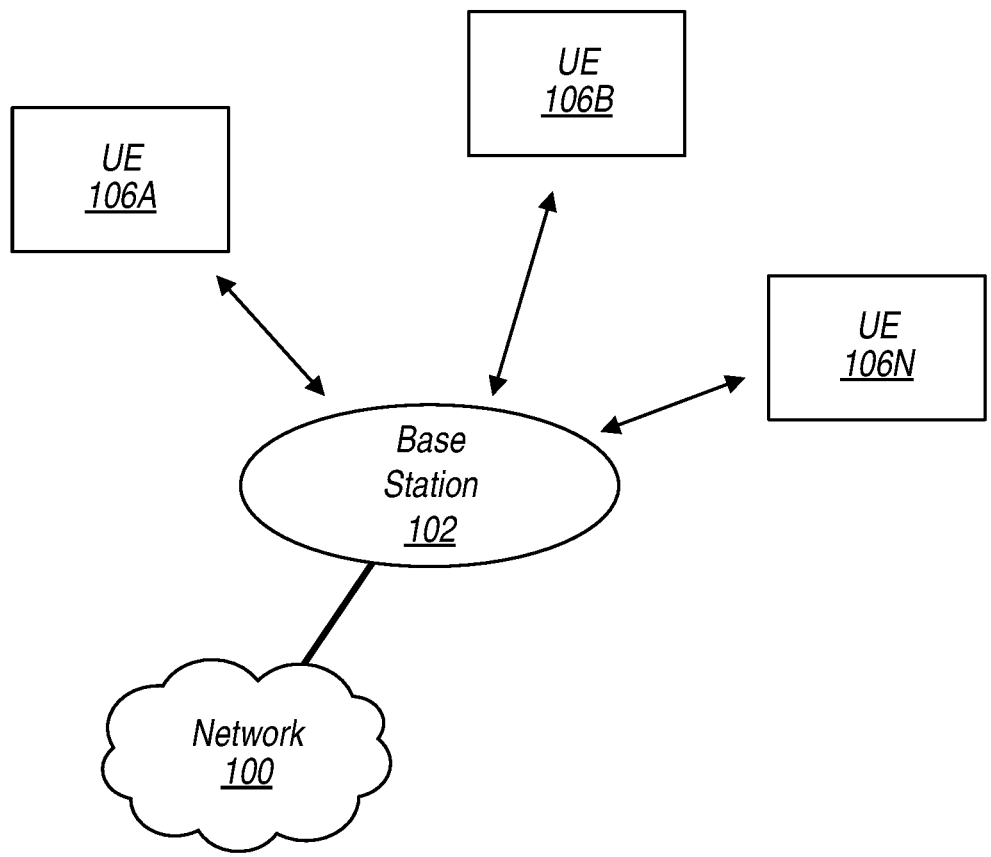
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives failing within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator
TRP: Transmission and Reception Point
NC-JT: Non-coherent-Joint Transmission
FDMed: Frequency Division Multiplexed
TDMed: Time Division Multiplexed
SFN: Single Frequency Network
RSRP: Reference Signal Received Power
SINR: Signal-to-Interference-Plus Noise Ratio Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance. Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones, portable gaming devices, laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a Fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast. WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, W LAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
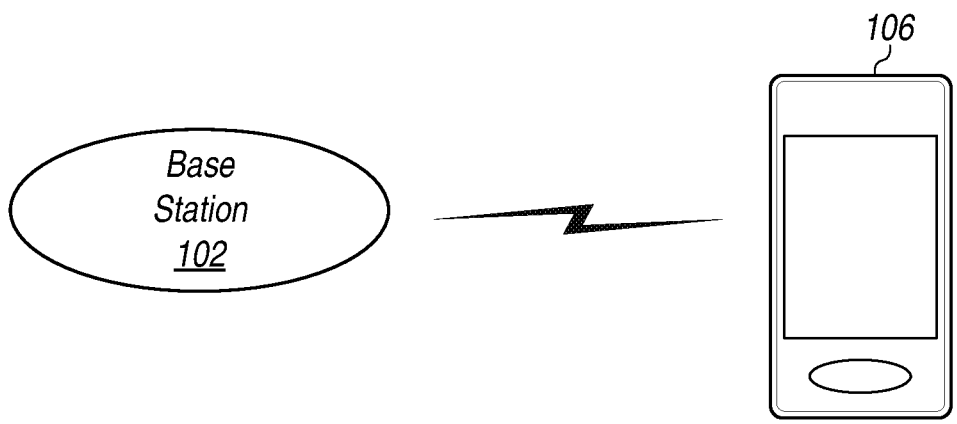
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of user devices 106A, 100B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 may also be configured to be camped on and communicate with multiple base stations concurrently. In some embodiments, the UE 106 may be configured to perform cross-cell beam failure recovery using a contention based random access procedure, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 100 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
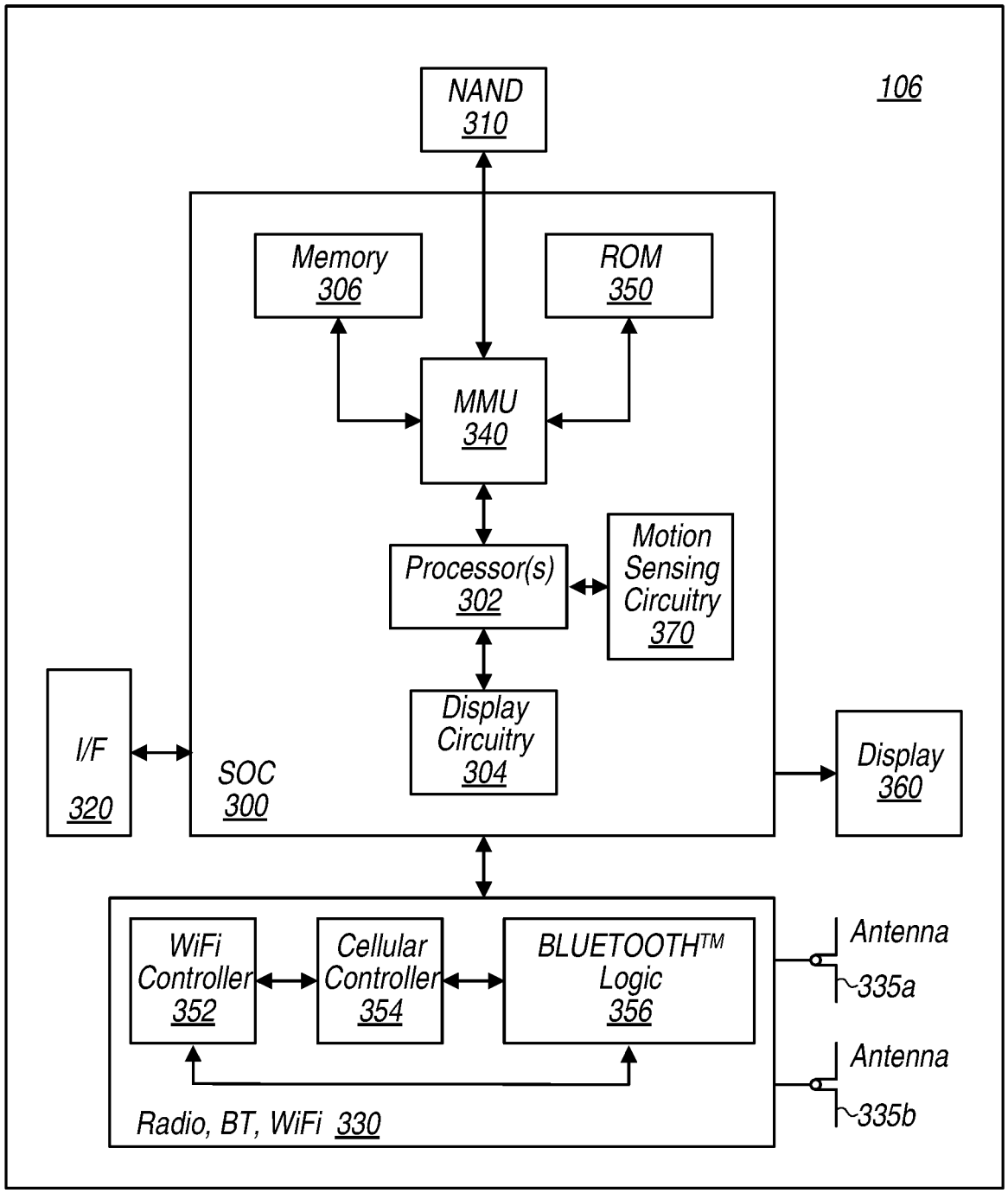
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry which may perform graphics processing and provide display signals to the display 360. The processor (s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery using a contention based random access procedure such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments may have fewer or more similar controllers for various different RATs that may be implemented in UE device 106.

Figure 4:
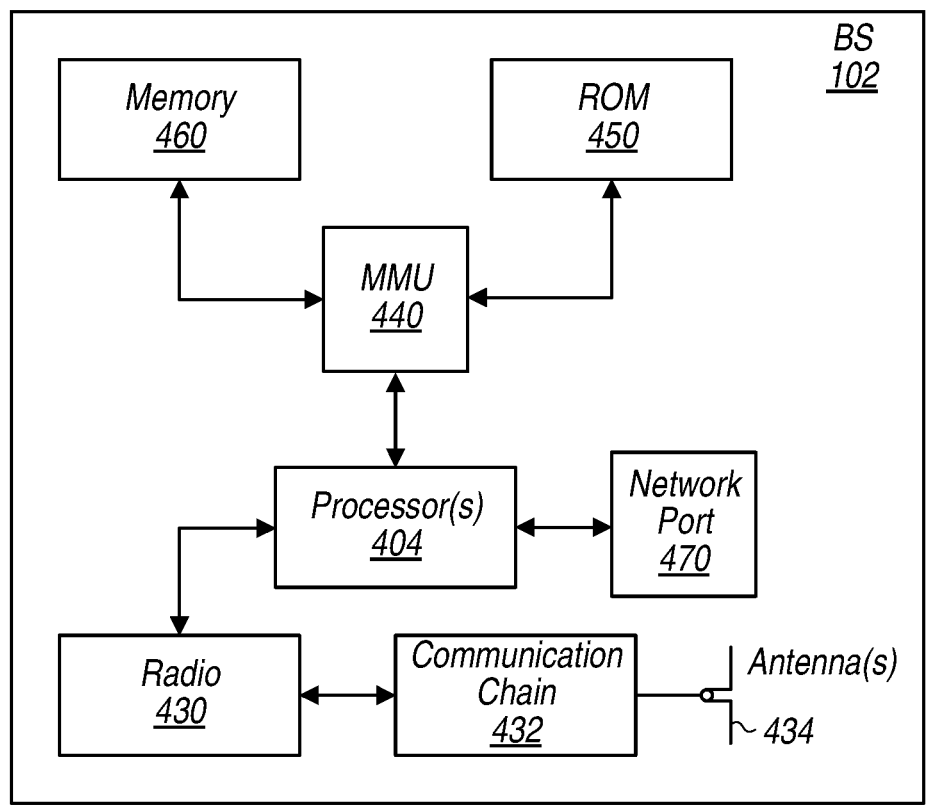
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460) and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network. e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may also be designed as an access point (AP), in which case network port 470 may be implemented to provide access to a wide area network and/or local area network (s), e.g., it may include at least one Ethernet port, and radio 430 may be designed to communicate according to the Wi-Fi standard. The base station 102 may operate according to the various methods as disclosed herein for providing control signaling for use in performing beam failure recovery in a cellular communication system.

Beam Reporting to Facilitate Multi-TRP Transmission Schemes

In current implementations of multi-TRP transmission schemes, a wireless device (e.g., a UE) may receive signals from different TRPs with the same or different UE antenna panels. In other words, the UE may receive signals either using a single antenna panel or using multiple (e.g., more than one) antenna panels. In some instances, if and/or when a signal is received from one UE antenna panel, up to a minimum (N_tx, N_rx) layers can be supported, where N_tx indicates a total number of transmission ports from two TRPs and where N_rx indicates a number of ports per antenna panel. In other words, a maximum number of layers than can be supported by the UE may be based on the lesser of a number of transmission ports from two TRPs and a number of ports per antenna panel. In other instances, if and/or when a signal is received from two UE antenna panels, up to a minimum of (N_tx, 2*N_rx) layers may be supported. In other words, a maximum number of layers than can be supported by the UE may be based on the lesser of a number of transmission ports from two TRPs and two times a number of ports per antenna panel.

Implementations of 3GPP Release 16 allows support of three TRP transmission schemes that are standardized:
(1) non-coherent-joint transmission (NC-JT) in which different layers are transmitted from different TRPs;
(2) frequency division multiplexed (FDMed) based transmissions in which the same transport block is carried by different TRPs with different frequency resources and the same redundant version (RV) or different RVs are used for different repetitions; and
(3) time division multiplexed (TDMed) based transmissions in which the same transport block is carried by different TRPs with different symbols/slots and the same RV or different RVs are used for different repetitions.

Additionally, 3GPP Release 17 introduced support of a fourth transmission scheme and standardized:

(4) a Single Frequency Network (SFN) based transmission scheme in which the same transport block is transmitted from different TRPs in fully overlapped resources.

Figure 5:
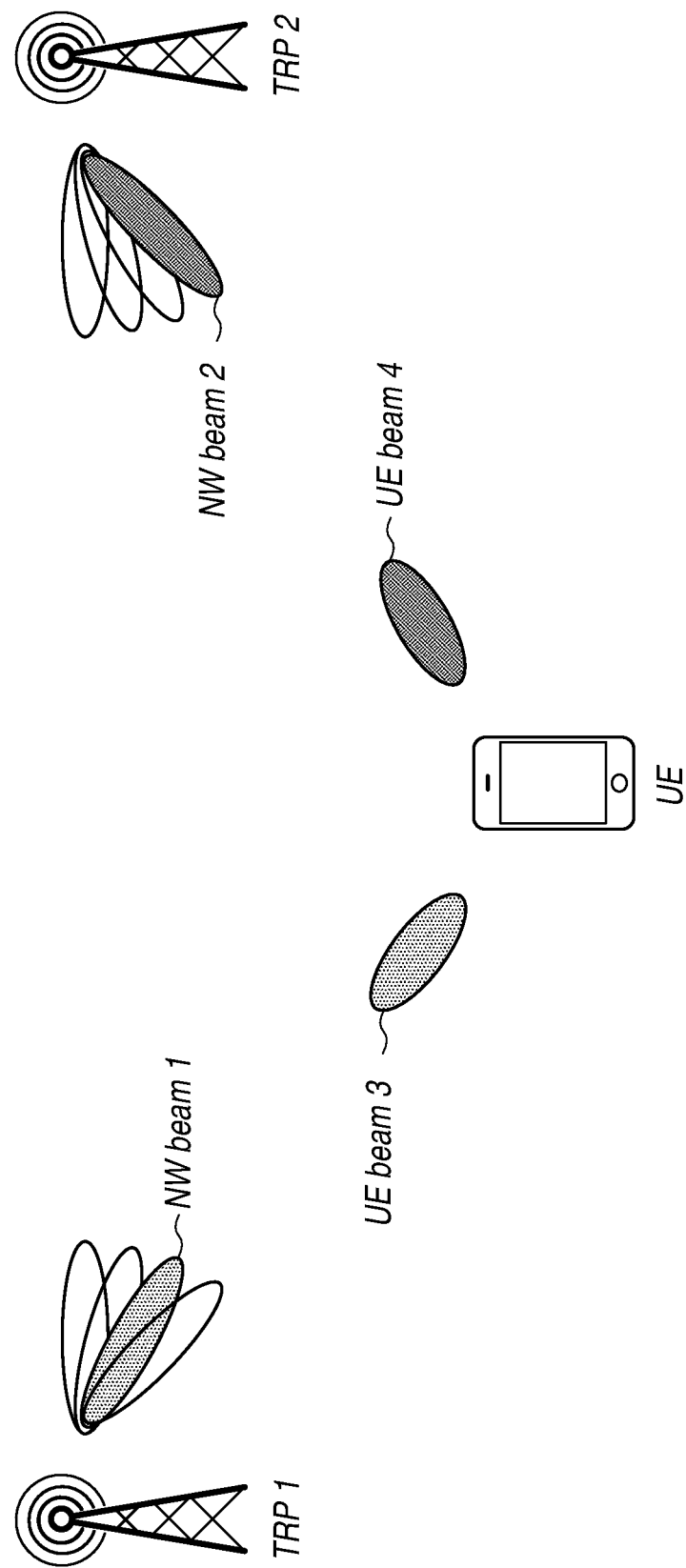
FIG. 5 illustrates transmissions between multiple TRPs and a UE using selected beams.

In addition, current implementations use beam reporting from the UE to the base station in order to facilitate beam selection for transmitting and receiving transmissions between the UE and the base station. In particular, for FDMed and TDMed based multi-TRP transmission schemes, current beam reporting schemes/procedures may be used to facilitate beam selection on a per TRP basis. However, for NC-JT and SFN based multi-TRP transmission schemes, beam reporting schemes/procedures may need to consider the simultaneous transmission and reception status for both the base station and the UE. For example, FIG. 5 illustrates transmissions between multiple TRPs and a UE using selected beams. As shown, a first TRP (TRP 1) may communicate with the UE using network (NW) beam 1 and a second TRP (TRP 2) may communicate with the UE using NW beam 2. Similarly, the UE may communication with TRP 1 using UE beam 3 and with TRP 2 using UE beam 4. Thus, for an NC-JT TRP transmission scheme, beam reporting may include a signal part, which would include NW-UE beam pairs {1,3} and {2,4} and an interference part, which would include NW-UE beam pairs {2,3} and {1,4} as well as inter-cell interference. Similarly, for SFN based TRP transmission schemes, beam reporting may include a signal part, which would include NW-UE beam pairs {1,3}, {2,4}, {2,3} and {1,4}, and an interference part, which would include inter-cell interference.

Figure 6B:
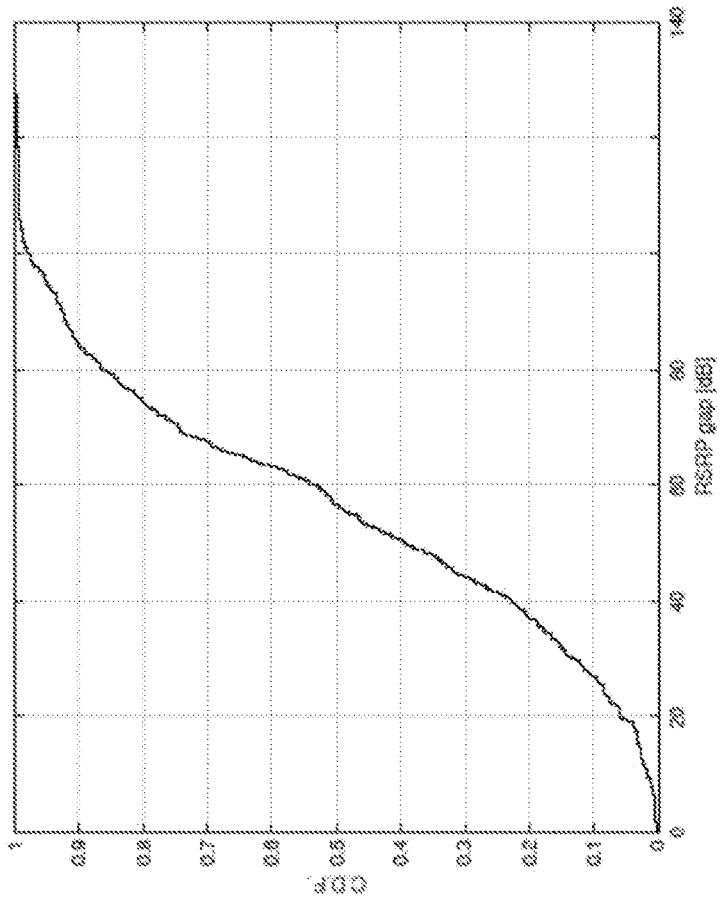
FIGS. 6A and 6B illustrate example simulation results for multi-TRP communications between a UE and base station.
Figure 6A:
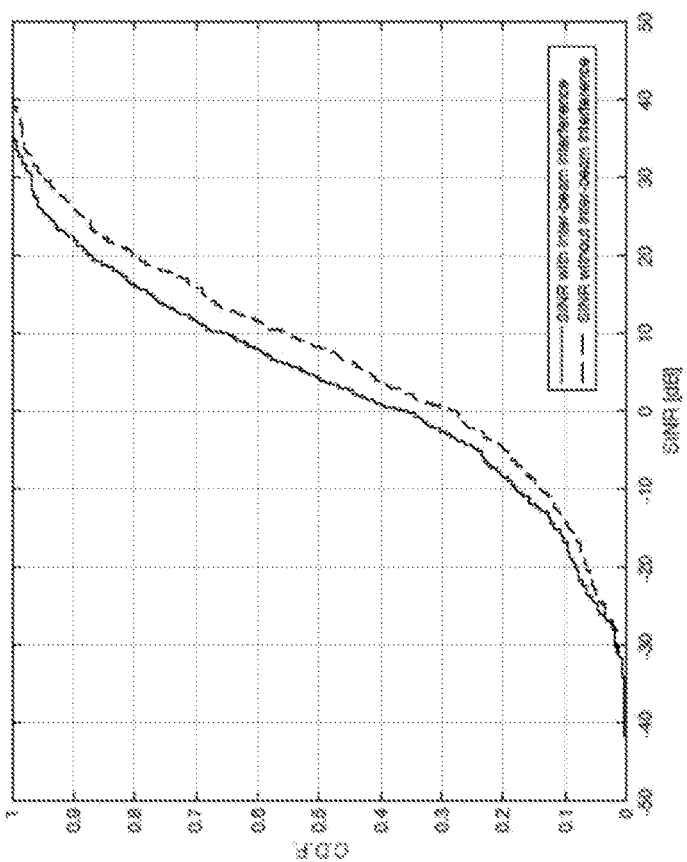

FIGS. 6A and 6B illustrate example simulation results for multi-TRP communications between a UE and a base station. As can be seen from the cumulative distribution function (CDF) of the signal to interference plus noise ratio (SINR) per UE antenna panel with and without inter-beam interference illustrated by FIG. 6A, inter-panel interference may cause some performance degradation. Further, as can be seen from the CDF of reference signal received power (RSRP) gap between two TRPs for each UE antenna panel, RSRP from one of the TRPs may be dominate over an RSRP from the other TRP. Thus, based on the simulations, it becomes apparent that inter-beam interference may need to be considered for beam selection/reporting when using an NC-JT multi-TRP transmission scheme. Further, based on the simulations, considering SFN based multi-TRP transmission schemes, only a small portion of UEs may need to consider RSRP from a second TRP. In other words, a vast majority of UEs may only need to consider RSRP from one TRP for beam selection/reporting.

Embodiments described herein provide systems, methods, and mechanisms for enhancing beam reporting to facilitate different transmission schemes, e.g., such as NC-JT multi-TRP and SFN based multi-TRP transmission schemes. In particular, embodiments described herein address how to maintain the same understanding between a base station, such as base station 102, and a UE, such as UE 106, that the beam reporting is to facilitate one transmission scheme. Additionally, embodiments described herein provide systems, methods and mechanisms for determining report quantity and measurement behavior. Further, embodiments described herein provide systems, methods and mechanisms for determining UE behavior for UE beam selection to measure different network beams. In addition, embodiments described herein provide systems, methods and mechanisms for addressing how to maintain the same understanding between a base station, such as base station 102, and a UE, such as UE 106, on whether the beams are received from a single UE antenna panel or from multiple UE antenna panels.

In some embodiments, a base station, such as base station 102, may configure a target transmission scheme or beam reporting scheme for a beam report configuration and/or a multiple beam report configuration. For example, the base station may configure a UE, such as UE 106, to report a beam quality based on one or more beam reporting schemes. The base station may configure the UE to report the beam quality via higher layer signaling, such as radio resource control (RRC) signaling and/or a MAC control element (CE). Additionally, and/or alternatively, the base station may configure the UE to report the beam quality via a UE capability.

In a first scheme, e.g., scheme 1-1, a UE may report layer 1 (L1) RSRP/L1-SINR for multiple beams. The beams may be divided into N groups (e.g., where N is 2, 4, 6, 8 and so forth). Additionally, beams within a group may be associated with a TRP/UE antenna panel, e.g., beams in different groups may be received simultaneously. Thus, for each beam, the UE may report a beam index, e.g., such as an SSB resource index (SSBRI) or a CSI-RS resource index (CRI), as well as L1-RSRP/L1-SINR. Then, the base station may use the reported information for each beam to facilitate beam selection for an SFN multi-TRP transmission scheme. Note that beams within a group may be configured in one or multiple report configurations. Note further that the report configurations may be predefined and/or configured by the base station. In addition, the UE may report beams in different groups in one reporting instance and/or multiple reporting instances, e.g., as predefined and/or configured by the base station. Further, when multiple report configurations/multiple instances are predefined and/or configured by the base station, the base station may configure an association between two report configurations via RRC signaling.

For example, the UE may report a panel index and/or measurement process index for each instance. As another example, each instance may be associated with a different UE antenna panel. Note that beams in different instances may be received simultaneously within a time window. The time window may be reported by the UE and/or predefined and/or configured by the base station. For example, FIGS. 7A, 7H, 7C, and 7D illustrate various scenarios for defining a time window, according to embodiments.

Figure 7A:
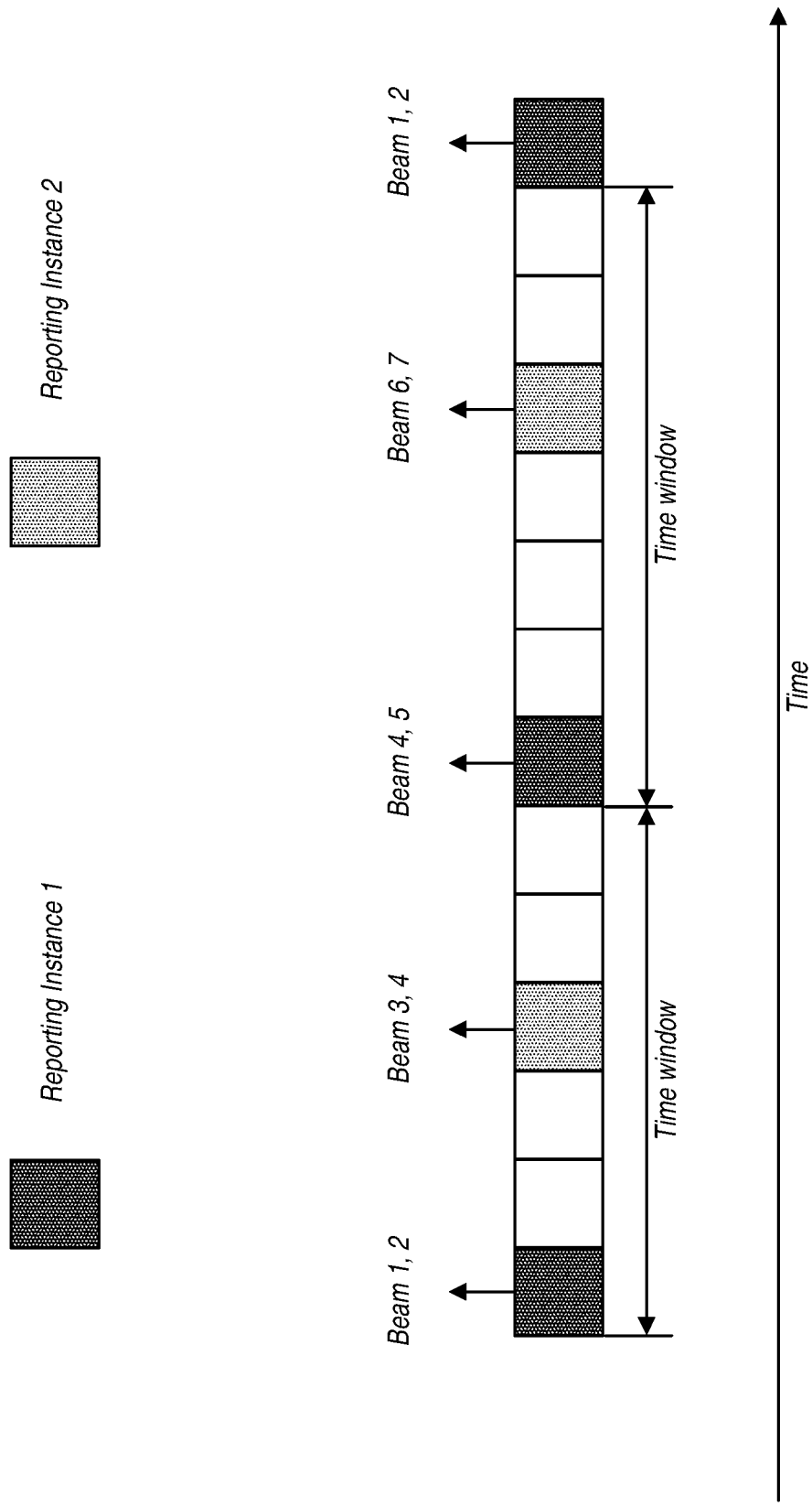
FIGS. 7A, 7B, 7C, and 7D illustrate various scenarios for defining a time window, according to embodiments.
Figure 7B:
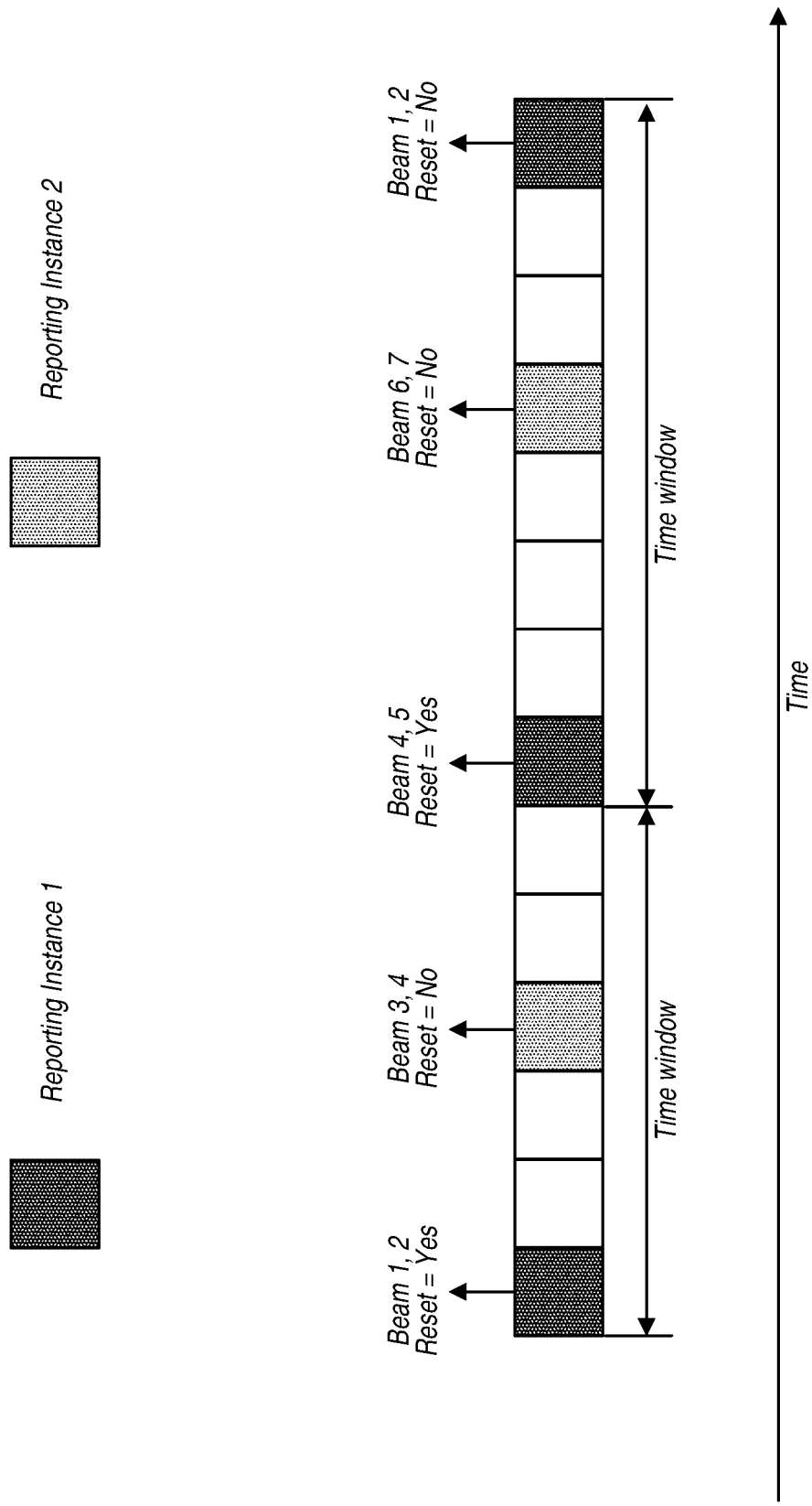

As shown in FIG. 7A, a starting point for a time window may be predefined, e.g., a reporting instance corresponding to a first report configuration. Thus, the time window may span a number of slots corresponding to a time period between reporting instances corresponding to a first report configuration. For example, a time window may start with a reporting instance 1 that includes beams 1 and 2 and continue for a second reporting instance that includes beams 3 and 4. Further, the time period may restart and/or reset for another reporting instance 1 that includes beams 4 and 5 and continue for another reporting instance 2 that includes beams 6 and 7.

As shown in FIG. 71, a starting point for a time window may be reported by the UE, e.g., in a beam reporting instance, the UE may inform the base station whether a timer needs to be reset. Thus, at a first reporting instance 1 that includes beams 1 and 2, the UE may indicate a timer rest. Then, during a reporting instance 2 that includes beams 3 and 4, the UE may indicate that the timer does not need to be reset. Further, during another reporting instance 1 that includes beams 4 and 5, the UE may again indicate a timer reset. As shown, for the next reporting instances, e.g., reporting instance 2 including beams 6 and 7 and reporting instance 1 including beams 1 and 2, the UE may indicate that the timer does not need to reset, thereby leading to a variable length time window.

Figure 7C:
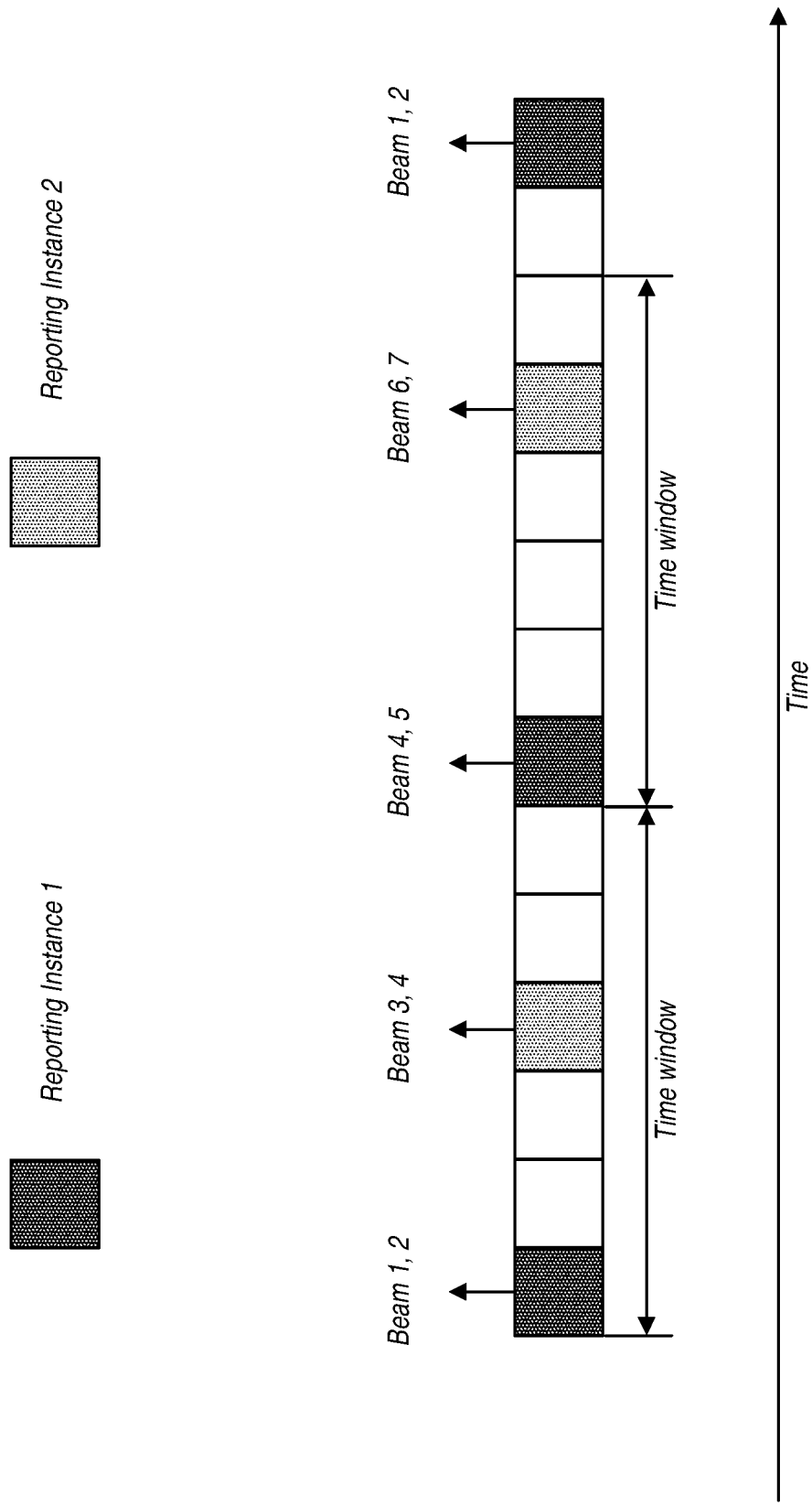

As shown in FIG. 7C, a starting point for a time window may be based on the length of the time window, e.g., the UE may reset a timer when the timer expires. Thus, as shown, a time window may be fixed at six slots and a timer associated with the time window may be reset after every six slots. Note that time window length of six slots is exemplary and other time window lengths (e.g., such as 2 slots, 4 slots, N slots, 10 slots, 12 slots, and so forth) are contemplated.

Figure 7D:
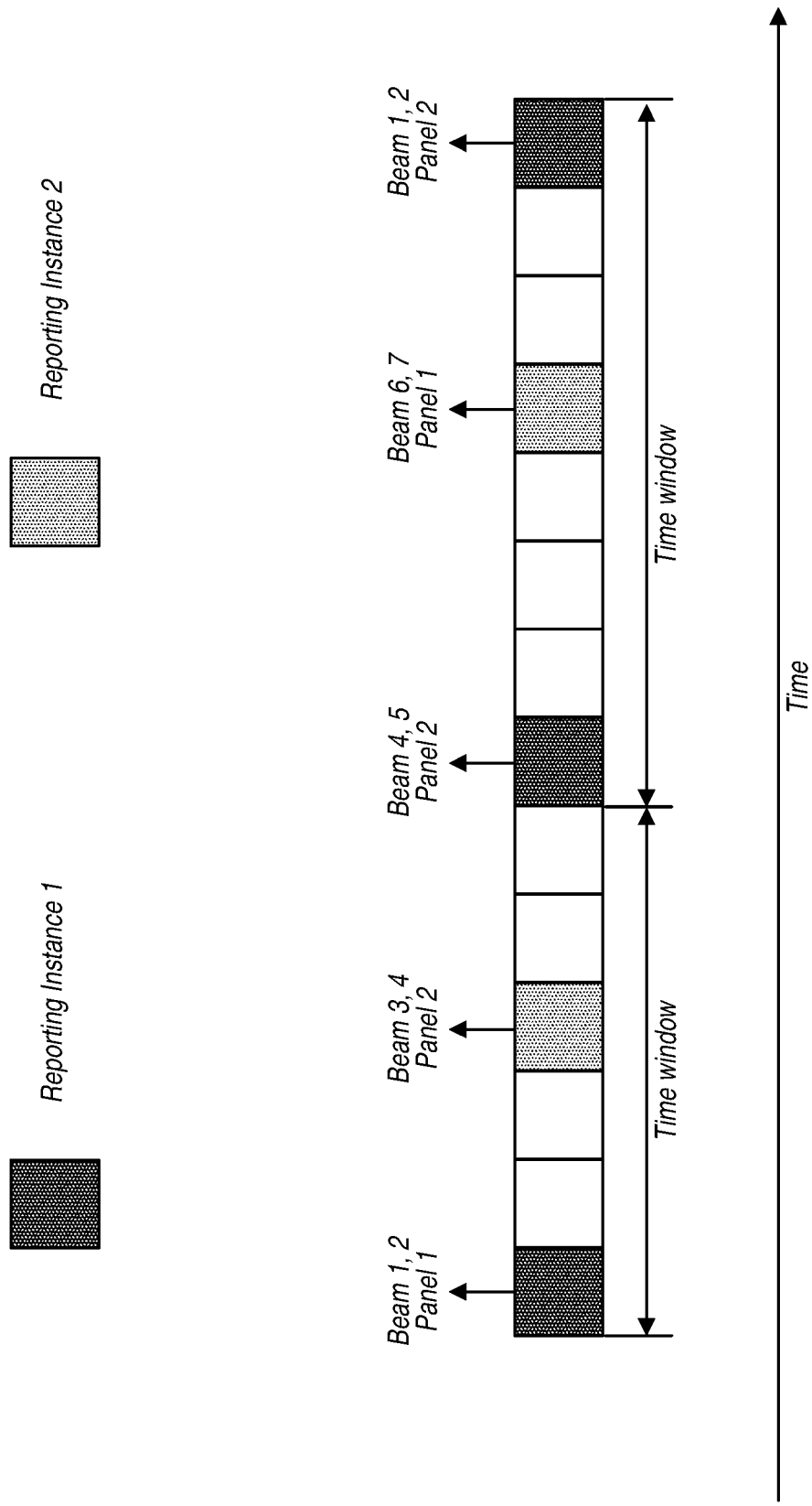

As shown in FIG. 7D, a starting point for a time window may be based on a reported UE antenna panel index for each reporting instance, e.g., the UE may reset a timer when a reported UE antenna panel index is changed for a reporting instance. Thus, as shown, when the UE changes a UE antenna panel index for reporting instance 1, the UE may reset the timer.

In another scheme, e.g., scheme 1-2, a UE may report L1-RSRP/L1-SINR for multiple beam pairs. The beams in one beam pair may be associated with different TRPs and may aid in facilitating a NC-JT multi-TRP transmission scheme. In some embodiments, a UE, such as UE 106, may report a recommended and/or assumed transmission schemed for a beam reporting instance, for multiple beam reporting instances, and/or for a reported beam pair in a beam reporting instance. Further, for each beam pair, the UE may report a beam index for each beam. N SSBRIs, CRIs, as well as corresponding L1-RSRP and/or L1-SINR. For example, FIGS. 8A, 8B, 8C, and 8D various formats for UE reports, according to some embodiments.

As shown in Figure HA, the UE may report N L1-RSRP and/or L1-SINR, where each L1-RSRP and/or L1-SINR may be measured based on each beam in the beam pair. For example, a report may include one or more of a first CRI and/or SSBRI (CRI/SSBRI #1) for a first beam pair (beam pair #1), a second CRI and/or SSBRI (CR/SSBRI #2) for the first beam pair, a third CRI and/or SSBRI (CRI/SSBRI #3) for the first beam pair, and a fourth CRI and/or SSBRI (CRI/SSBRI #4) for the first beam pair. Additionally, the report may include an L1-RSRP and/or L1-SINR for the first CRI and/or SSBRI as well as differential L1-RSRP and/or L1-SINR for the other CRIs and/or SSBRIs measured. Note that in some embodiments, for L1-SINR measurements, whether inter-beam interference is calculated or not may be predefined and/or configured by higher layer signaling.

As shown in FIG. 8B, the UE may report one L1-RSRP and/or L1-SINR, where L1-RSRP and/or L1-SINR may be measured based on the beams in the beam pair. For example, the L1-RSRP and/or L1-SINR may be based on an average, minimum, and/or maximum L1-RSRP and/or L1-SINR across beams. For example, a report may include one or more of a first CRI and/or SSBRI (CRI/SSBRI #1) for a first beam pair (beam pair #1) and a second CRI and/or SSBRI (CRI/SSBRI #2) for the first beam pair. Additionally, the report may include a third CRI and/or SSBRI (CRI/SSBRI #3) for a second beam pair (beam pair #2) and a fourth CRI and/or SSBRI (CRI/SSBRI #4) for the second beam pair. In addition, the report may include an L1-RSRP and/or L1-SINR for the first CRI and/or SSBRI as well as differential L1-RSRP and/or L1-SINR for the second beam pair. Note that in some embodiments, for L1-SINR measurements, whether inter-beam interference is calculated or not may be predefined and/or configured by higher layer signaling.

As shown in FIG. 8C, the UE may report one L1-RSRP and N L1-SINR, where L1-RSRP and/or L1-SINR may be measured based on the beams in the beam pair. For example, the L1-RSRP may be based on the average, minimum, and/or maximum L1-RSRP across beams. For example, a report may include one or more of a first CRI and/or SSBRI (CRI/SSBRI #1) for a first beam pair (beam pair #1) and a second CRI and/or SSBRI (CRI/SSBRI #2) for the first beam pair. Additionally, the report may include a third CRI and/or SSBRI (CRI/SSBRI #3) for a second beam pair (beam pair #2) and a fourth CRI and/or SSBRI (CR/SSBRI #4) for the second beam pair. In addition, the report may include an L1-RSRP for both the first beam pair and the second beam pair. Further, the report may include an L1-SINR for the first CRI and/or SSBRI as well as differential L1-SINR for the other CRIs and/or SSBRIs measured. Note that in some embodiments, for L1-SINR measurements, whether inter-beam interference is calculated or not may be predefined and/or configured by higher layer signaling.

As shown in FIG. 8D, the UE may report N L1-RSRP and one L1-SINR, where L1-RSRP and/or L1-SINR may be measured based on the beams in the beam pair. For example, the L1-SINR may be based on the average, minimum, and/or maximum L1-SINR across beams. For example, a report may include one or more of a first CRI and/or SSBRI (CRI/SSBRI #1) for a first beam pair (beam pair #1) and a second CRI and/or SSBRI (CRI/SSBRI #2) for the first beam pair. Additionally, the report may include a third CRI and/or SSBRI (CRI/SSBRI #3) for a second beam pair (beam pair #2) and a fourth CRI and/or SSBRI (CRI/SSBRI #4) for the second beam pair. In addition, the report may include an L1-SINR for both the first beam pair and the second beam pair. Further, the report may include an L1-RSRP for the first CRI and/or SSBRI as well as differential L1-RSRP and/or L1-SINR for the other CRIs and/or SSBRIs measured. Note that in some embodiments, for L1-SINR measurements, whether inter-beam interference is calculated or not may be predefined and/or configured by higher layer signaling.

In some embodiments, a UE, such as UE 106, may report a recommended and/or assumed transmission scheme for a beam reporting instance, for multiple beam reporting instances, and for a reported beam pair in a beam reporting instance. The base station may configure measurement resources from each TRP by a report configuration. The UE may report L1-SINR and/or L1-RSRP for multiple beam pairs as well as a recommended and/or assumed transmission scheme, e.g., such as NC-JT or SFN. In some embodiments, the recommended and/or assumed transmission scheme may be reported per reporting instance. In some embodiments, the recommended and/or assumed transmission scheme may be reported per beam pair. In some embodiments, for L1-SINR measurement, a recommended and/or assumed transmission scheme may be reported by reporting whether inter-beam interference is calculated or not. Note that if and/or when inter-beam interference is not included, it can imply the L1-SINR measurement is for a SFN multi-TRP transmission scheme. Note further that if inter-beam interference is included, it can imply the measurement is for a NC-JT multi-TR transmission scheme. In some embodiments, for L1-RSRP measurements, the UE may calculate RSRP based on the average, maximum, and/or minimum RSRP measured from one UE antenna panel for the beams from two TRPs or the UE may calculate RSRP based on the RSRP measured from a beam from one TRP. In some embodiments, the UE may report how RSRP is calculate, which may then imply the transmission scheme.

In some embodiments, for each beam pair, a UE, such as UE 106, may report whether the beams are received from one UE antenna panel or from multiple UE antenna panels. Such information may allow a base station, such as base station 102, to understand a maximum number of layers when the beams in the beam pair are indicated. The UE may report a number of antenna panels and/or a number of ports (e.g., a maximum number of layers) per antenna panel to the base station during a UE capability report procedure. In some embodiments, if and/or when a UE has a different number ports for different antenna panels, the UE may report the number of antenna panels and/or a number ports (e.g., a maximum number of layers) for each antenna panel to the base station during a UE capability report procedure. In addition, the UE may report a panel index associated with each beam in a beam pair. Additionally, and/or alternatively, the UE may report a maximum number of layers for a beam pair in a reporting instance.

In some embodiments, for L1-SINR measurement, a UE, such as UE 106, may need to measure beam quality from N (e.g., wherein N equals 2, 4, 6, 8 and so forth) channel measurement resources (CMRs). Further, if inter-beam interference needs to be measured, the UE may assume that a QCL-typeD (spatial Rx parameter, e.g., an Rx beam) assumption for the N CMRs may be based on all the QCL-typeD assumptions for the N CMRs. Thus, each CMR may be assumed with N QCL-typeD assumption and an interference measurement resource (IMR) associated with the N CMRs may be assumed to be QCLed with the CMRs. Further, the IMR may be assumed with the N QCL-typeD assumption. Additionally, other QCL parameters may be derived based on the QCL configuration for the CMR which is used as the signal part when calculating the L1-SINR.

FIGS. 9-12 illustrate block diagrams of example of methods for beam reporting to facilitate multiple transmission and reception points, multi-TRPs, transmission schemes, according to some embodiments. The methods shown in FIGS. 9-12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, these methods may operate as follows.

Turning to FIG. 9, at 902, a UE, such as UE 106, may receive, from a base station, such as base station 102, a configuration to report a beam quality based on at least one of a first reporting scheme or a second reporting scheme. The first reporting scheme may include the UE reporting at least one layer 1 (L1) measurement for multiple beams. The second reporting scheme may include the UE reporting at least one L1 measurement for multiple beam pairs. The at least one L1 measurement for multiple beams may include an L1 reference signal received power (RSRP) measurement for the multiple beams and/or an L1 signal to interference plus noise ratio (SINR) measurement for the multiple beams. The multiple beams may be divided into at least two groups. In other words, the multiple beams may be divided into two or more groups and/or a plurality of groups. Note that each group (e.g., of the at least two groups) may be associated with a TRP-UE antenna panel beam pairing. Additionally, beams in (and/or within) a group (e.g., of the at least two groups) may be configured in one report configuration and/or in multiple report configurations. In some embodiments, the report configuration may be predefined (e.g., via a 3GPP standard) and/or configured by the base station.

In some embodiments, the report configuration may include multiple report configurations and/or multiple beam reporting instances. Note that in such embodiments, the base station may configure an association between at least two report configurations of the multiple report configurations. Additionally, the association may be received from the base station via radio resource control (RRC) signaling.

At 904, the UE may report, to the base station, the beam quality based on the configuration. In some embodiments, reporting the beam quality based on the configuration may include the UE reporting beams in different groups of the at least two groups in one reporting instance based. Note that the reporting may be predefined (e.g., via a 3GPP standard) and/or configured by the base station.

In some embodiments, reporting the beam quality based on the configuration may include the UE reporting beams in different groups (e.g., of the at least two groups) in multiple reporting instances, e.g., as predefined (e.g., via a 3GPP standard) and/or configured by the base station. Additionally, reporting the beam quality based on the configuration may include the UE reporting a panel index and/or beam measurement process index for each report configuration and/or beam reporting instance. Note that each report configuration and/or beam reporting instance may be associated with a different UE antenna panel.

In some embodiments, beams in different beam reporting instances may be received by the UE simultaneously within a time window. The time window may be reported by the UE. Further, the time window may be predefined (e.g., via a 3GPP standard) and/or configured by the base station. In some embodiments, a starting point of the time window is predefined. In some embodiments, the starting point of the time window may be reported by the UE. For example, the UE may inform the base station. e.g., in a beam reporting instance, whether a timer associated with the time window should be reset. In some embodiments, the starting point of the time window may be based on a length of the time window. As an example, the UE may reset a timer associated with the time window upon expiration of the timer. In some embodiments, the starting point of the time window may be based (e.g., at least in part) on a reported antenna panel index for each beam reporting instance. The UE may reset a timer associated with the time window when a reported UE antenna panel index has changed.

In some embodiments, reporting the beam quality based on the configuration may include the UE reporting at least one of an L1 reference signal received power (RSRP) or an L1 signal to interference plus noise ratio (SINR) for multiple beam pairs. The beams in a beam pair may be associated with different TRPs. Additionally, for each beam pair, the UE may further report a beam index for each beam. N synchronization signal block (SSB) resource indexes (SSBRIs) and channel status information, CSI, reference signals, CSI-RS. In some embodiments, reporting at least one of an L1-RSRP or an L1-SINR for multiple beam pairs includes reporting N L1-RSRPs or N L1-SINRs. Note that, at least in some embodiments. N may be greater than or equal to two and/or N may be a multiple of two. In some embodiments, each L1-RSRP and/or L1-SINR may be measured based on each beam in a beam pair.

In some embodiments, reporting at least one of an L1-RSRP and/or an L1-SINR for multiple beam pairs may include reporting one L1-RSRP and/or one L1-SINR. In some embodiments, each L1-RSRP and/or L1-SINR may be measured based on beams in the beam pair.

In some embodiments, reporting at least one of an L1-RSRP and/or an L1-SINR for multiple beam pairs may include reporting one L1-RSRP and N L1-SINRs, where N may be greater than or equal to two and/or N may be a multiple of two. In some embodiments, each L1-RSRP and/or L1-SINR may be measured based on beams in the beam pair. Additionally, the one L1-RSRP may be based on at least one of an average, minimum, and/or maximum L1-RSRP across the beams in the beam pair.

In some embodiments, reporting at least one of an L1-RSRP and/or an L1-SINR for multiple beam pairs may include reporting N L1-RSRPs and one L1-SINR, where N may be greater than or equal to two and/or N may be a multiple of two. In some embodiments, the one L1-SINR may be based on at least one of an average, minimum, and/or maximum L1-SINR across the beams in the beam pair.

In some embodiments, whether an inter-beam interference is calculated may be predefined, e.g., via a 3GPP standard. In some embodiments, whether inter-beam interference is calculated may be configured via higher layer signaling between the UE and the base station.

In some embodiments, for each beam of the multiple beams, the UE may report a beam index. The beam index may include an SSBRI and/or a CSI-RS resource index.

In some embodiments, reporting the beam quality based on the configuration may include the UE reporting whether beams are received from one UE antenna panel and/or multiple UE antenna panels.

In some embodiments, the UE may send, to the base station, a UE capability report. The UE capability report may include a number of UE antenna panels and at least one of a number of ports per UE antenna panel or a number of ports for each UE antenna panel. Additionally, the UE capability report may further include a UE antenna panel index associated to with each beam in a beam pair. Further, the UE capability report may further include a maximum number of layers for a beam pair in a reporting instance.

In some embodiments, the UE may measure beam quality from multiple channel measurement resources. CMRs, e.g., when the UE reports L1-SINR. In some embodiments, when inter-beam interference is measured, the UE may assume that a quasi-co-located (QCL) typeD assumption for the multiple CMRs is based on all QCL-typeD assumptions for the multiple CMRs. Additionally, an interference measurement resource (IMR) associated with the multiple CMRs may be assumed to be QCLed with the CMRs.

Turning to FIG. 10, at 1002, a base station, such as base station 102, may send, to a UE, such as UE 106, a configuration to report a beam quality based on at least one of a first reporting scheme or a second reporting scheme. The first reporting scheme may include configuring the UE reporting at least one layer 1 (L1) measurement for multiple beams. The second reporting scheme may include configuring the UE reporting at least one L1 measurement for multiple beam pairs. The at least one L1 measurement for multiple beams may include an L1 reference signal received power (RSRP) measurement for the multiple beams and/or an L1 signal to interference plus noise ratio (SINR) measurement for the multiple beams. The multiple beams may be divided into at least two groups. In other words, the multiple beams may be divided into two or more groups and/or a plurality of groups. Note that each group (e.g., of the at least two groups) may be associated with a TRP-UE antenna panel beam pairing. Additionally, beams in (and/or within) a group (e.g., of the at least two groups) may be configured in one report configuration and/or in multiple report configurations. In some embodiments, the report configuration may be predefined (e.g., via a 3GPP standard) and/or configured by the base station.

In some embodiments, the report configuration may include multiple report configurations and/or multiple beam reporting instances. Note that in such embodiments, the base station may configure an association between at least two report configurations of the multiple report configurations. Additionally, the association may be received from the base station via radio resource control (RRC) signaling.

At 1004, the base station may receive, from the UE, a report of the beam quality based on the configuration. In some embodiments, receiving a report of the beam quality based on the configuration may include receiving a report for beams in different groups of the at least two groups in one reporting instance based. Note that the reporting may be predefined (e.g., via a 3GPP standard) and/or configured by the base station.

In some embodiments, receiving a report on the beam quality based on the configuration may include the receiving a report on beams in different groups (e.g., of the at least two groups) in multiple reporting instances, e.g., as predefined (e.g., via a 3GPP standard) and/or configured by the base station. Additionally, receiving a report on the beam quality based on the configuration may include receiving a report on a panel index and/or beam measurement process index for each report configuration and/or beam reporting instance. Note that each report configuration and/or beam reporting instance may be associated with a different UE antenna panel.

In some embodiments, beams in different beam reporting instances may be received by the UE simultaneously within a time window. The time window may be reported by the UE. Further, the time window may be predefined (e.g., via a 3GPP standard) and/or configured by the base station. In some embodiments, a starting point of the time window is predefined. In some embodiments, the starting point of the time window may be reported by the UE. For example, the UE may inform the base station, e.g., in a beam reporting instance, whether a timer associated with the time window should be reset. In some embodiments, the starting point of the time window may be based on a length of the time window. As an example, the UE may reset a timer associated with the time window upon expiration of the timer. In some embodiments, the starting point of the time window may be based (e.g., at least in part) on a reported antenna panel index for each beam reporting instance. The UE may reset a timer associated with the time window when a reported UE antenna panel index has changed.

In some embodiments, receiving a report on the beam quality based on the configuration may include receiving a report on at least one of an L1 reference signal received power (RSRP) or an L1 signal to interference plus noise ratio (SINR) for multiple beam pairs. The beams in a beam pair may be associated with different TRPs. Additionally, for each beam pair, the UE may further report a beam index for each beam. N synchronization signal block (SSB) resource indexes (SSBRIs) and channel status information, CSI, reference signals, CSI-RS. In some embodiments, reporting at least one of an L1-RSRP or an L1-SINR for multiple beam pairs includes reporting N L1-RSRPs or N L1-SINRs. Note that, at least in some embodiments, N may be greater than or equal to two and/or N may be a multiple of two. In some embodiments, each L1-RSRP and/or L1-SINR may be measured based on each beam in a beam pair.

In some embodiments, receiving a report on at least one of an L1-RSRP and/or an L1-SINR for multiple beam pairs may include receiving a report on one L1-RSRP and/or one L1-SINR. In some embodiments, each L1-RSRP and/or L1-SINR may be measured based on beams in the beam pair.

In some embodiments, receiving a report on at least one of an L1-RSRP and/or an L1-SINR for multiple beam pairs may include receiving a report on one L1-RSRP and N L1-SINRs, where N may be greater than or equal to two and/or N may be a multiple of two. In some embodiments, each L1-RSRP and/or L1-SINR may be measured based on beams in the beam pair. Additionally, the one L1-RSRP may be based on at least one of an average, minimum, and/or maximum L1-RSRP across the beams in the beam pair.

In some embodiments, receiving a report on at least one of an L1-RSRP and/or an L1-SINR for multiple beam pairs may include receiving a report on N L1-RSRPs and one L1-SINR, where N may be greater than or equal to two and/or N may be a multiple of two. In some embodiments, the one L1-SINR may be based on at least one of an average, minimum, and/or maximum L1-SINR across the beams in the beam pair.

In some embodiments, whether an inter-beam interference is calculated may be predefined, e.g., via a 3GPP standard. In some embodiments, whether inter-beam interference is calculated may be configured via higher layer signaling between the UE and the base station.

In some embodiments, for each beam of the multiple beams, the base station may receive a beam index. The beam index may include an SSBRI and/or a CSI-RS resource index.

In some embodiments, receiving a report on the beam quality based on the configuration may include the receiving a report on whether beams are received from one UE antenna panel and/or multiple UE antenna panels.

In some embodiments, the base station may receive, from the UE, a UE capability report. The UE capability report may include a number of UE antenna panels and at least one of a number of ports per UE antenna panel or a number of ports for each UE antenna panel. Additionally, the UE capability report may further include a UE antenna panel index associated with each beam in a beam pair. Further, the UE capability report may further include a maximum number of layers for a beam pair in a reporting instance.

In some embodiments, the UE may measure beam quality from multiple channel measurement resources, CMRs, e.g., when the UE reports L1-SINR. In some embodiments, when inter-beam interference is measured, the UE may assume that a quasi-co-located (QCL) typeD assumption for the multiple CMRs is based on all QCL-typeD assumptions for the multiple CMRs. Additionally, an interference measurement resource (IMR) associated with the multiple CMRs may be assumed to be QCLed with the CMRs.

Figure 11:
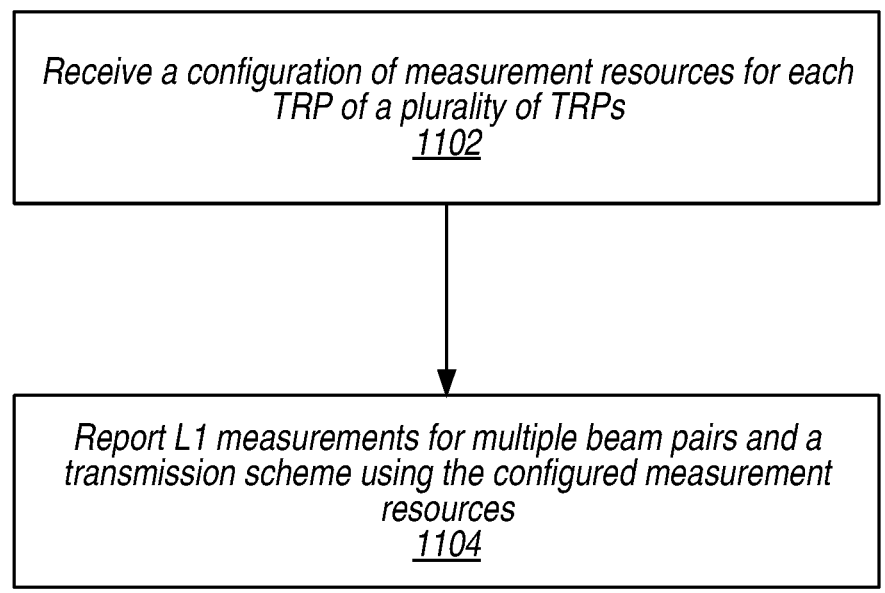

Turning to FIG. 11, at 1102, a UE, such as UE 106, may receive, from a base station, such as base station 102, a configuration of measurement resources for each TRP of a plurality of TRPs.

At 1104, the UE may report, to the base station, L1 measurements for multiple beam pairs and a transmission schemed using the configured measurement resources. In other words, the UE may report L1 measurements for multiple beam pairs and a recommended and/or assumed transmission scheme, where the L1 measurements use the configured measurement resources. In some embodiments, the recommended and/or assumed transmission scheme may one of a non-coherent-joint transmission (NC-JT) transmission scheme and/or a single frequency network (SFN) transmission scheme. In some embodiments, reporting the beam quality based on the configuration may include the UE reporting whether beams are received from one UE antenna panel and/or multiple UE antenna panels. In some embodiments, the at least one L1 measurement for multiple beam pairs may include an L1-RSRP for the multiple beam pairs and/or an L1-SINR for the multiple beam pairs. In some embodiments, reporting, to the base station, the L1 measurements for multiple beam pairs and the recommended and/or assumed transmission scheme may include the UE reporting the recommended and/or assumed transmission scheme per reporting instance. In some embodiments, reporting, to the base station, the L1 measurements for multiple beam pairs and the recommended and/or assumed transmission scheme may include the UE reporting the recommended and/or assumed transmission scheme per beam pair. In some embodiments, reporting, to the base station, the L1 measurements for multiple beam pairs and the recommended and/or assumed transmission scheme may include the UE reporting the recommended and/or assumed transmission scheme by indicating whether inter-beam interference was calculated. Note that the calculation of inter-beam interference may indicate L1 measurements are for an SFN transmission scheme. Note further that an absence of calculation of inter-beam interference may indicate L1 measurements are for an NC-JT transmission scheme.

In some embodiments, L1 measurements may include L1-RSRP that may be calculated based on the recommended and/or assumed transmission scheme. Note that when the recommended and/or assumed transmission scheme is an SFN transmission scheme, the L1-RSRP may be calculated based on at least one of an average, a minimum, and/or a maximum RSRP measured from an antenna panel of the UE for beams from multiple TRPs. Note further that when the recommended and/or assumed transmission scheme is an NC-JT transmission scheme, the L1-RSRP may be calculated based on an RSRP measurement from a beam from one TRP.

In some embodiments, the UE may send, to the base station, a UE capability report. The UE capability report may include a number of UE antenna panels and at least one of a number of ports per UE antenna panel or a number of ports for each UE antenna panel. Additionally, the UE capability report may further include a UE antenna panel index associated with each beam in a beam pair. Further, the UE capability report may further include a maximum number of layers for a beam pair in a reporting instance.

In some embodiments, the UE may measure beam quality from multiple channel measurement resources, CMRs, e.g., when the UE reports L1-SINR. In some embodiments, when inter-beam interference is measured, the UE may assume that a quasi-co-located (QCL) typeD assumption for the multiple CMRs is based on all QCL-typeD assumptions for the multiple CMRs. Additionally, an interference measurement resource (IMR) associated with the multiple CMRs may be assumed to be QCLed with the CMRs.

Figure 12:
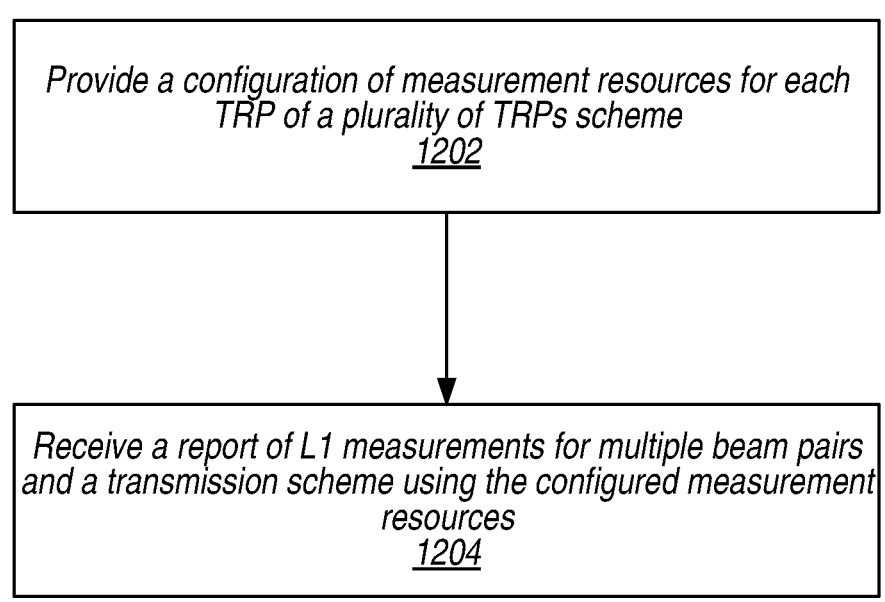

Turning to FIG. 12, at 1202, a base station, such as base station 102, may provide (e.g., send and/or transmit), to a UE, such as UE 106, a configuration of measurement resources for each TRP of a plurality of TRPs.

At 1204, the base station may receive, from the UE, a report of L1 measurements for multiple beam pairs and a transmission schemed using the configured measurement resources. In other words, the base station may receive a report of L1 measurements for multiple beam pairs and a recommended and/or assumed transmission scheme, where the L1 measurements use the configured measurement resources. In some embodiments, the recommended and/or assumed transmission scheme may one of a non-coherent-joint transmission (NC-JT) transmission scheme and/or a single frequency network (SFN) transmission scheme. In some embodiments, receiving the report of the beam quality (e.g., L1 measurement) based on the configuration may include the base station receiving a report on whether beams are received from one UE antenna panel and/or multiple UE antenna panels. In some embodiments, the at least one L1 measurement for multiple beam pairs may include an L1-RSRP for the multiple beam pairs and/or an L1-SINR for the multiple beam pairs. In some embodiments, receiving the report of the L1 measurements for multiple beam pairs and the recommended and/or assumed transmission scheme may include the receiving the report of the recommended and/or assumed transmission scheme per reporting instance. In some embodiments, receiving the report of L1 measurements for multiple beam pairs and the recommended and/or assumed transmission scheme may include the receiving the report of the recommended and/or assumed transmission scheme per beam pair. In some embodiments, receiving the report of the L1 measurements for multiple beam pairs and the recommended and/or assumed transmission scheme may include the receiving the report of the recommended and/or assumed transmission scheme via an indication of whether inter-beam interference was calculated. Note that the calculation of inter-beam interference may indicate L1 measurements are for an SFN transmission scheme. Note further that an absence of calculation of inter-beam interference may indicate L1 measurements are for an NC-JT transmission scheme.

In some embodiments, L1 measurements may include L1-RSRP that may be calculated based on the recommended and/or assumed transmission scheme. Note that when the recommended and/or assumed transmission scheme is an SFN transmission scheme, the L1-RSRP may be calculated based on at least one of an average, a minimum, and/or a maximum RSRP measured from an antenna panel of the UE for beams from multiple TRPs. Note further that when the recommended and/or assumed transmission scheme is an NC-JT transmission scheme, the L1-RSRP may be calculated based on an RSRP measurement from a beam from one TRP.

In some embodiments, the base station may receive, from the UE, a UE capability report. The UE capability report may include a number of UE antenna panels and at least one of a number of ports per UE antenna panel or a number of ports for each UE antenna panel. Additionally, the UE capability report may further include a UE antenna panel index associated with each beam in a beam pair. Further, the UE capability report may further include a maximum number of layers for a beam pair in a reporting instance.

In some embodiments, the UE may measure beam quality from multiple channel measurement resources, CMRs, e.g., when the UE reports L1-SINR. In some embodiments, when inter-beam interference is measured, the UE may assume that a quasi-co-located (QCL) typeD assumption for the multiple CMRs is based on all QCL-typeD assumptions for the multiple CMRs. Additionally, an interference measurement resource (IMR) associated with the multiple CMRs may be assumed to be QCLed with the CMRs.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for beam reporting to facilitate multiple transmission and reception points, multi-TRPs, transmission schemes, the method comprising:
   receiving, from a base station, a configuration to report a beam quality, wherein the configuration indicates reporting at least one layer 1, L1, measurement for multiple beams received at a user equipment device (UE), wherein the multiple beams are divided into at least two groups, and wherein each group of the at least two groups is associated with a TRP-UE antenna panel beam pairing; and
   reporting the beam quality based on the configuration, wherein the report comprises, for each beam of the multiple beams, a beam index and an L1 measurement.

2. The method of claim 1,
   wherein the beam index comprises a synchronization signal block (SSB) resource index (SSBRI).

3. The method of claim 1,
   wherein the beam index comprises a channel status information (CSI) reference signal (CSI-RS) resource index.

4. The method of claim 1,
wherein the L1 measurement comprises an L1 reference signal received power (RSRP).

5. The method of claim 1,
wherein the L1 measurement comprises an L1 signal to interference plus noise ratio (SINR).

6. The method of claim 1,
wherein the reporting is via higher layer signaling.

7. The method of claim 1,
wherein the reporting is via UE capability.

8. A user equipment device (UE), comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to communications;
wherein the one or more processors are configured to cause the UE to:
  receive, from a base station, a configuration to report a beam quality, wherein the configuration indicates reporting at least one layer 1, L1, measurement for multiple beams received at the UE, wherein the multiple beams are divided into at least two groups, and wherein each group of the at least two groups is associated with a transmission and reception point (TRP)-UE antenna panel beam pairing; and
  report the beam quality based on the configuration, wherein the report comprises, for each beam of the multiple beams, a beam index and an L1 measurement.

9. The UE of claim 8,
wherein the beam index comprises a synchronization signal block (SSB) resource index (SSBRI).

10. The UE of claim 8,
wherein the beam index comprises a channel status information (CSI) reference signal (CSI-RS) resource index.

11. The UE of claim 8,
wherein the L1 measurement comprises an L1 reference signal received power (RSRP).

12. The UE of claim 8,
wherein the L1 measurement comprises an L1 signal to interference plus noise ratio (SINR).

13. The UE of claim 8,
wherein the reporting is via higher layer signaling.

14. The UE of claim 8,
wherein the reporting is via UE capability.

15. A base station configured to perform wireless communication with a user equipment device (UE), the base station comprising:
a radio; and
a processing element operatively coupled to the radio;
wherein the processing element is configured to cause the base station to:
  transmit, to the UE, a configuration to report a beam quality, wherein the configuration indicates reporting at least one layer 1, L1, measurement for multiple beams received at a user equipment device (UE), wherein the multiple beams are divided into at least two groups, and wherein each group of the at least two groups is associated with a TRP-UE antenna panel beam pairing; and
  receive, from the UE, a report of the beam quality based on the configuration, wherein the report comprises, for each beam of the multiple beams, a beam index and an L1 measurement.

16. The base station of claim 15,
wherein the beam index comprises a synchronization signal block (SSB) resource index (SSBRI).

17. The base station of claim 15,
wherein the beam index comprises a channel status information (CSI) reference signal (CSI-RS) resource index.

18. The base station of claim 15,
wherein the L1 measurement comprises an L1 reference signal received power (RSRP).

19. The base station of claim 15,
wherein the L1 measurement comprises an L1 signal to interference plus noise ratio (SINR).

20. The base station of claim 15,
wherein the reporting is via higher layer signaling or UE capability.

* * * * *